United States Patent [19]
Hoegger

[11] 3,746,610
[45] July 17, 1973

[54] COMPOSITE BOARDS PREPARED FROM FOAM SHEETING

[75] Inventor: Erhard Fritz Hoegger, Wilmington, Del.

[73] Assignee: E. I. du Pont de Nemours and Company, Wilmington, Del.

[22] Filed: Jan. 29, 1971

[21] Appl. No.: 110,962

[52] U.S. Cl.................. 161/168, 156/62.2, 161/64, 161/159, 161/160, 264/109
[51] Int. Cl...................... B32b 5/16, B32b 21/02
[58] Field of Search........................ 264/45, 47, 321, 264/109; 161/87, 158, 168, DIG. 2, 159, 160, 162, 64; 117/100 C; 156/62.2

[56] References Cited
UNITED STATES PATENTS

| | | | |
|---|---|---|---|
| 3,594,335 | 7/1971 | Schultz et al. | 161/168 X |
| 3,607,999 | 9/1971 | Corbett et al. | 161/168 X |
| 3,598,672 | 8/1971 | Heller | 161/168 X |
| 3,564,085 | 2/1971 | Schickedanz | 264/321 X |

FOREIGN PATENTS OR APPLICATIONS
1,944,128   8/1970   Germany

*Primary Examiner*—William A. Powell
*Attorney*—Louis Del Vecchio

[57] ABSTRACT

A composite board prepared by reducing foam sheeting into flakes, collecting the flakes and arranging them in batt form, heating the batt to a temperature sufficient to render the flake surface tacky, compressing the hot batt to the desired thickness and cooling the compressed batt to a temperature sufficient to bond the flake surfaces, thereby forming a composite board. Optionally, the flakes can be coated with an adhesive before they are distributed into batt form and the adhesive on the surface of the flakes in the batt heated to the tack temperature of the adhesive rather than the tack temperature of the foam. This composite board can be formed from waste foam sheeting and is particularly useful as a shock insulator in packaging.

9 Claims, 6 Drawing Figures

PATENTED JUL 17 1973 3,746,610

INVENTOR
ERHARD FRITZ HOEGGER

BY James Del Vecchio

ATTORNEY

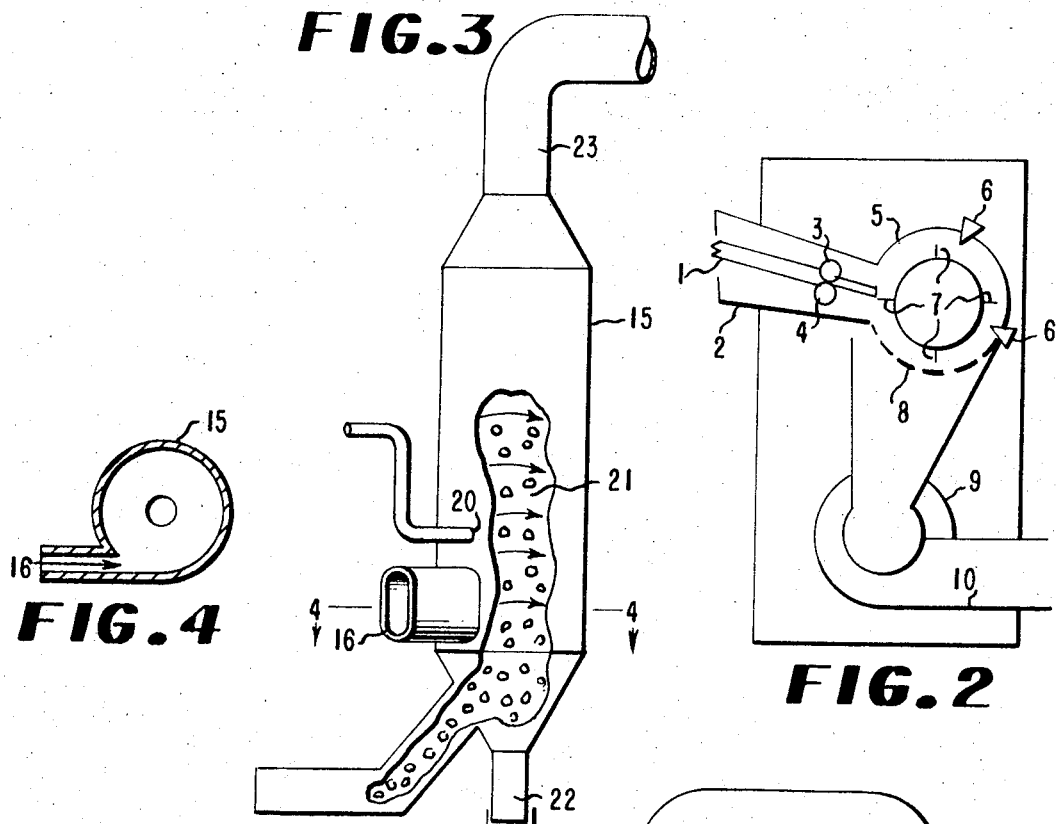
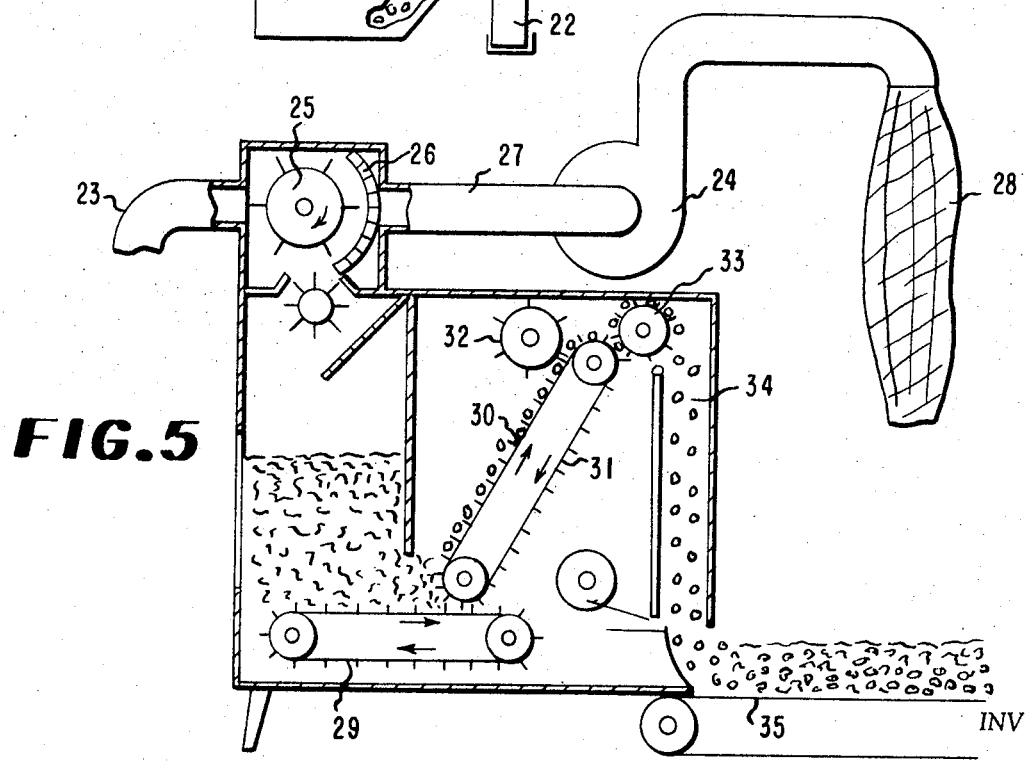

COMPOSITE BOARDS PREPARED FROM FOAM SHEETING

BACKGROUND OF THE INVENTION

This invention relates to a composite board including the process and apparatus for preparing it from foam sheeting.

U.S. Pat. application Ser. No. 797,312, filed Dec. 27, 1968, now U.S. Pat No. 3,637,458, discloses a low density foam sheet having a high work-to-break value made from a thermoplastic crystalline polymer comprising polyhedral shaped closed cells having a median diameter of at least 500 microns and a process for its preparation by flash extrusion with reduced bubble nuclei formation.

During the process of preparing such foam, waste foam is formed. Waste foam includes off-specification foam, the end sections of foam sheet rolls, edge trimmings, and start-up. To enhance the economics of producing on-specification foam, it is desirable to find an economic way of using the waste foam. An obvious possibility is to remelt the foam waste and feed it back into the process along with the starting ingredients, but this has been found to be uneconomical. Another possibility is to use the waste foam as stuffings for toys, pillows and other stuffed items; however, this is generally uneconomical, since scrap foam is so expensive that it usually cannot compete with conventionally known, cheaper stuffing materials.

The problem of finding an economical manner of using scrap foam is a problem typical in the foam manufacturing industry and a solution would not only improve the economic value of producing the foam in the first instance, but also would reduce manufacturing waste, thereby reducing possible pollution problems. Therefore, it is desirable to find an economic way of using scrap foam.

SUMMARY OF THE INVENTION

Accordingly, the invention provides a composite board of foam flakes bonded together. The composite board is prepared by an apparatus and process for:

a. reducing foam sheeting to flake-like pieces having a minimum dimension of at least about one-eighth-inch and a maximum dimension of about 8 inches;
b. distributing the flakes in batt form;
c. heating the surface of the flakes in the batt to the tack temperature of the foam;
d. compressing the batt; and
e. cooling the compressed batt.

Preferably, the process additionally includes the steps of applying a heat-sensitive adhesive coating to the flakes before they are distributed into batt form wherein the dried adhesive applied amounts to 10–60, and preferably 15–45, weight percent of the flakes; and heating the adhesive on the surface of the flakes in the batt to the tack temperature of the adhesive rather than the tack temperature of the foam.

BRIEF DESCRIPTION OF THE DRAWINGS

FIG. 2 is an enlarged schematic diagram of the foam cutting station shown in FIG. 1.

FIG. 3 is an enlarged schematic diagram of the adhesive spray station shown in FIG. 1.

FIG. 4 is a cross-sectional view along line 4—4 of the adhesive spray station shown in FIG. 3.

FIG. 5 is an enlarged schematic diagram of the batt-forming station shown in FIG. 1.

DETAILS OF THE INVENTION

Figure 1:
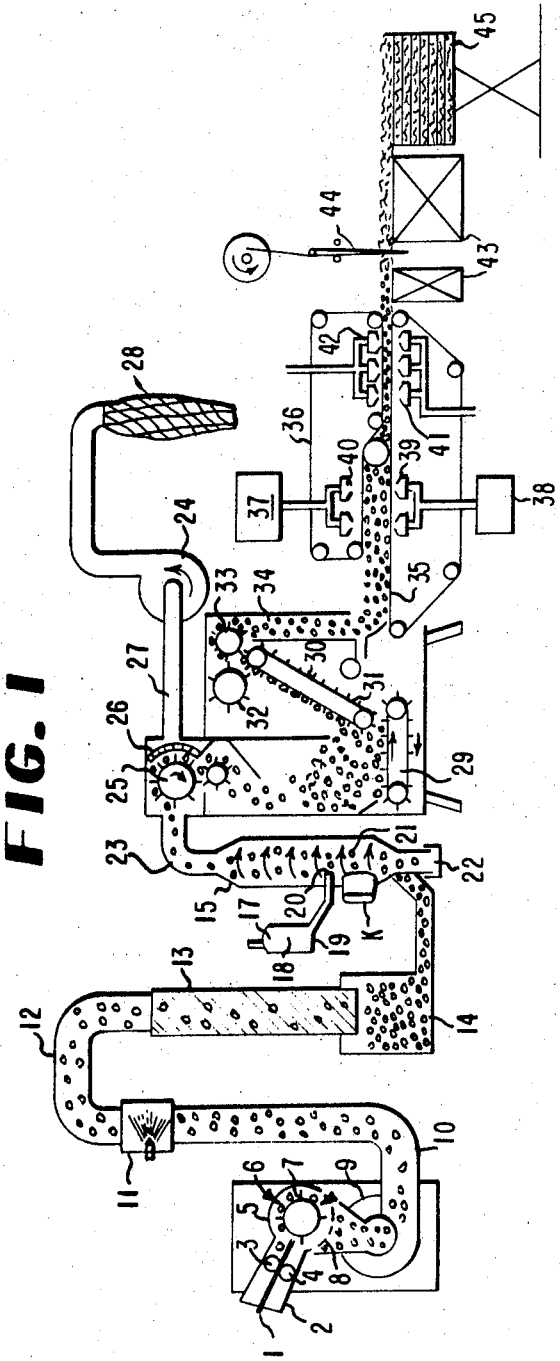
FIG. 1 is a schematic flowsheet of a fabrication line for preparing composite foam boards according to the preferred embodiment of the present invention.

The foam useful in this invention includes cellular polymer sheets prepared from polymers such as polyurethane, polyethylene, polypropylene, polystyrene, nylon and polyester.

The foam sheeting useful in this invention can be standard production run product reduced to flake; however, it can also be scrap material taken from various scrap sources. Scrap sources include edge trim, off-standard sheeting, clippings, or start-up waste sheeting.

Foam sheeting particularly useful in this invention because of its excellent end properties, such as cushioning and insulation, is the microfoam sheeting of U.S. Pat. application Ser. No. 797,312, filed Dec. 27, 1968 hereby incorporated by reference. Such a foam is described therein as a linear, thermoplastic, crystalline polymer preferably linear polyethylene or isotactic polypropylene of film-forming molecular weight, substantially free from crosslinking, and having a work-to-break value of at least 10,000 in.-lbs./in.$^3$. The foam consist essentially of polyhedral shaped closed cells whose median diameter is at least 500 microns, wherein the cells have a wall thickness of about 0.5 to about 3.0 microns, and the cell walls are characterized by a nonuniform texture. The foam has a maximum density of 0.03 g./cc.

The microfoam sheeting can be prepared by the extrusion process comprising preparing a solution of synthetic crystalline organic polymer in an activating liquid, said activating liquid having a boiling point at least 25°C. below the melting point of the polymer and being a solvent for the polymer at the extrusion conditions while dissolving less than 1 percent of the polymer at temperatures up to the normal solvent boiling point. The solution temperature prior to extrusion is greater than the freezing point of the solution and below that temperature where adiabatic evaporation of all the activating liquid present will produce insufficient cooling for solid polymer precipitation. The concentration of activating liquid prior to extrusion is between 98 percent by weight with a minimum amount sufficient to pre-cipitate solid polymer on adiabatic evaporation. The solution is extruded into a region of substantially lower pressure and temperature whereby varporization of the activating liquid rapidly cools the solution to the temperature at which solid polymer precipitates and freezes in the polymer orientation. Bubble nuclei formation occurs upon extrusion and is restricted to less than $10^5$ per cubic centimeters by maintaining the solution temperature prior to extrusion below the self-nucleating temperature of the activating liquid and preventing fibrillation by maintaining said solution temperature below its fibrillation temperature.

The activating liquid can be selected from the group consisting of methylene chloride, fluorotrichloromethane, and mixtures thereof, and in combination with perfluorocyclobutane, dichlorotetrafluoroethane, dichlorodifluoromethane and mixtures thereof. The composition of the activating liquid is adjusted in a manner such that the activating liquid is less permeant to the cell walls than the external gaseous atmosphere and the external partial pressure of the gaseous atmosphere is greater than the internal partial pressure of the activating liquid atmosphere to at least partially expand and inflate the cells without substantially stretching the cell walls.

Polymers which can be used to make this microfoam according to the process include crystallizable, linear, organic polymers substantially free from crosslinking such as polyhydrocarbons (e.g., linear polyethylene, isotactic polypropylene), polyesters (e.g., polyethylene terephthalate), and polyamides.

After the foam sheeting is obtained, whether it be standard product or waste product, it is reduced to random flake sizes usually about one-eighth-inch square or larger but generally below about an 8-inch square and preferably about 4 inches in maximum dimension. The size is generally determined by the handling capabilities of the machines involved and the size of the composite board being made.

The foam sheeting can be reduced to flake size by various means including cutting, shredding, slicing, chopping, tearing or combinations of these means.

If desired, the board can be made from a mixture of flakes of two or more kinds of foam, or a mixture of foam flakes with nonfoam materials such as shredded paper or fabrics, or wood chips. These nonfoam materials are considered to be fillers, and should be added, of course, in amounts which do not significantly detract from the desired end properties.

In one embodiment of this invention, the flakes are formed into a loose batt and the surface of the flakes heated to the tack temperature of the flakes. The word "tack" and its derivatives when used herein refers to that property of the flake or, more precisely, that property of the polymer making up the flake which causes two layers of polymer, i.e., flakes, to adhere when firmly pressed together so that attempted separation under force will generally occur at some point other than the two original surfaces. After heating, the flakes in loose batt form are compressed and then cooled. Upon cooling, the compressed flakes remain together forming a composite board.

In a preferred embodiment of this invention, an adhesive is used to bond the flakes together. It is preferred that an adhesive be used because it makes it easier to obtain a good bond between the flakes at lower bonding temperatures. Low bonding temperatures are desired because high bonding temperatures tend to destroy the cell structure of the foam.

Therefore, in a preferred embodiment, the flakes are conveyed either mechanically or pneumatically to an adhesive applicator. Application of the adhesive is accomplished by suspending the flakes in swirling air and spraying the flakes directly or by creating an atomized atmosphere through which the flakes move or both. The amount of adhesive to be applied to the flakes depends on the type of adhesive used and the cohesive strength desired.

Useful adhesives are prepared in a volatile liquid base, generally water, as a dispersion or an emulsion, wherein the adhesive is essentially nonadhesive in this form, yet becomes an adhesive, i.e., tacky, when heat is applied to the adhesive after driving off the volatile base. The adhesive is selected so that the temperature at which the adhesive becomes tacky is below that temperature at which it collapses the cellular structures of the foam. If the adhesive is of the thermoplastic type, the tack temperature of the adhesive must be higher than the normal use temperature of the composite board being formed so that the adhesive will not become soft, thereby making the composite structure deformable in use. If the adhesive is of the thermoset type, the tack temperature need only be below the temperature that would cause collapse of the cellular structure.

Representative examples of useful adhesives include: ionomeric resin dispersions such as those disclosed in U.S. Pat. No. 3,296,172; the ionomer resin dispersions and vinyl resin dispersions, described in the trade bulletin printed March 1969 and entitled "Elvax D" (trademark of E. I. du Pont de Nemours and Company) which are water dispersions of high molecular weight ethylene interpolymers; certain acrylic resin emulsions such as Rhoplex (trademark of Rohm & Haas Co.) and Gelva (trademark of Monsanto Co.), a vinyl resin dispersion.

The preferred adhesive is a vinyl resin water dispersion having a 40–50 percent solids concentration and is applied to the flakes in such a ratio that the flakes have on their surface about 10–6 weight percent, and preferably 15–45 weight percent, of dried adhesive, based on the weight of the flakes. The coated flakes are laid down in batt form, i.e., a uniformly thick layer of loose flakes. Batt thickness depends on the thickness and density desired in the final product. The batt is then conveyed to a bonding station. The bonder performs the multiple functions of: evaporating the volatile base from the adhesive; heating the adhesive until it becomes tacky; compressing the batt to the desired thickness while the adhesive is tacky; and maintaining this compressive force until the adhesive has cooled and/or set and bonded the flakes together.

The temperature to which the adhesive is heated, as discussed above, along with the air flow must be sufficient to evaporate the volatile base liquid and make the adhesive tacky yet not collapse the cell walls or melt the foam.

For the preferred embodiment, this temperature is generally in the range of about 80°–110°C. for polyethylene, 100°–145°C. for polypropylene and the air flow is about 3,000 to 15,000 feet per minute. It is important that the heating take place while the composite structure is in the form of a loose batt; that is, before compressive forces are applied. This permits the hot air to permeate the loose batt and heat preferentially the adhesive on the surface of the flakes even in the internal portions of the batt. The batt material, itself, is a heat insulator and is very difficult to heat after compression has taken place.

The compressed batt is a composite board in sheet form and can be cut and shaped into various sizes and forms to suit the end-use needs. If desired, the composite board can optionally be post pressed, smoother, embossed or contoured to obtain various functional or aesthetic effects.

The composite boards of this invention have uses including the following: shock insulators, thermal insulators, electrical insulators, and sound insulators. They have been found particularly useful as shock insulators or as package cushioning because, depending on density and thickness, various cushioning effects can be obtained to package either delicate articles, such as crystal tableware or heavier articles, such as motors. Other uses include wall insulation for homes; sporting goods, such as gym mats or bottom mats for tents; or sound insulation, such as for ceiling tile or room separators. In addition, composite boards of this invention can be processed to form other useful materials. For example, the composite board can be laminated to microfoam sheeting to improve its slip characteristics and to make it nonflaking; or it can be laminated to sheet materials prepared from vinyl, nylon, polyolefins, or polyesters to make it practically impervious; or it can be used for simple decorative purposes. It can also be sprayed with paint to obtain color effects, special structural surface effects, or to make it less flammable. It can be flocced with fibers such as rayon, cotton or nylon for various surface effects, for functional reasons or for reasons of aesthetics, or it can be embossed to obtain various surface effects.

Following is a description of the preferred embodiment in conjunction with the drawings:

Referring to FIG. 1, microfoam sheeting described in U.S. Pat. Application Ser. No. 797,312, filed Dec. 27, 1968, 1 is fed through chute 2 to nip rolls 3 and 4 into a cutting station 5 containing one or more bed knives 6 and one or more rotary knives 7. Below the rotary knives is a screen arrangement 8 to pass uniformly cut flakes and facilitate the efficient discharge of the cut-to-size foam. FIG. 2 shows an enlarged drawing of the cutting station. Useful cutters are commercially available and they include rotary knife cutters, Models BR, MR, and MRP of Sprout-Waldron Manufacturing Engineers, Muncy, Pa.; and heavy-duty grinders, such as Model HD-8 of Foremost Machine Builders, Inc., Fairfield, N.J.

The foam material, as flakes, is drawn into a blower 9 which blows the flakes through conduit 10; through an antistatic treatment device 11, which can be a water spray, a humidistat, or an electrical discharge treater; through conduit 12 then through air separator conduit 13 and into a storage bin 14. From the storage bin, the flakes are sucked into adhesive spray station 15 by suction fan 24. Alternatively, air separator 13 and storage bin 14 can be eliminated and the airborne flakes carried directly to the binder spray station.

In the adhesive spray station, the flakes are swirled around by air drawn in through port 16 into the spray station at a tangent to the circular cylinder comprising the main body of the spray station forming a swirling type current of air. While the flakes are swirling around the spray station, they are drawn upwards and are sprayed with an adhesive spray from spray system 17 wherein an adhesive 18 in pressure tank 19 is discharged through one or more adhesive spray nozzles 20 into adhesive spray station 15 partially coating the flakes while simultaneously creating an atmosphere 21 of an atomized adhesive through which the flakes pass as they rise through the adhesive spray station. At the bottom of the spray station is a drain 22 to collect excess adhesive.

FIG. 3 more clearly shows the adhesive spray station in finer detail and FIG. 4, which is a cross section of the main body of the adhesive spray station taken along line 4—4 of FIG. 3, shows the input region of tangential air through port 16 into the adhesive spray station. The adhesive spray station 15 is not conventional.

The coated flakes are drawn through the adhesive spray station, then directed through conduit 23 and into flake distributor 25. Behind the flake distributor is a filter 26 and a conduit 27 wherein fine particles are drawn through suction fan 24 and into a fine particle collection bag 28. Flakes leaving distributor 25 collect in a bin and are carried away by feeding apron 29 which is a horizontal conveyor belt. From the horizontal conveyor belt, flakes are picked up by scoops 30 on inclined apron 31 which is an inclined conveyor belt. The flakes are then fed past doffer drum 32, strip roll 33 and into packing chute 34. The section of this equipment from distributor 25 through to the packing chute is referred to as a batt-forming station and is shown in FIG. 5 in more detail. A commercially available machine useful as a batt-forming station is called a Metrafeed, Model No. MT 109-G sold by Fiber Controls Corp. of Gastonia, N.C.

From chute 34 in the batt-forming station, the packed flakes are fed into a bonding station, In the bonding station, particles are fed onto a horizontal conveyor belt 35. Above horizontal conveyor belt 35 is a top belt 36 used to hold the flakes in place and then compress the flakes on the horizontal conveyor belt. For efficient use in this process where convection heating is used to heat the flakes and the adhesive, he belts should have sufficient openings through the belts to permit convection heating to take place. Typically useful belts include link belts and screen belts. The opening in the belt is depending on the size of the flakes and the characteristics of the hot air blower.

While the flakes are still in loose batt form, they are subjected to hot air from blowers 37 and 38 through hot air blast plenums 39 and 40. The hot loose batt is then compressed between the constriction formed between lower conveyor belt 35 and upper conveyor belt 36. The compressed batt is then subjected to cold air blasts from cold air nozzles 41 and 42. The compressed flakes are now bonded together as a composite board.

Alternatively, but not shown, the compressed batt can be cooled by passing the belts while compressing the batt through chilled compression plates sometimes referred to as chill plate compression shoes. Both chill convection cooling and chill plate compression shoes can be used in series.

Figure 6:
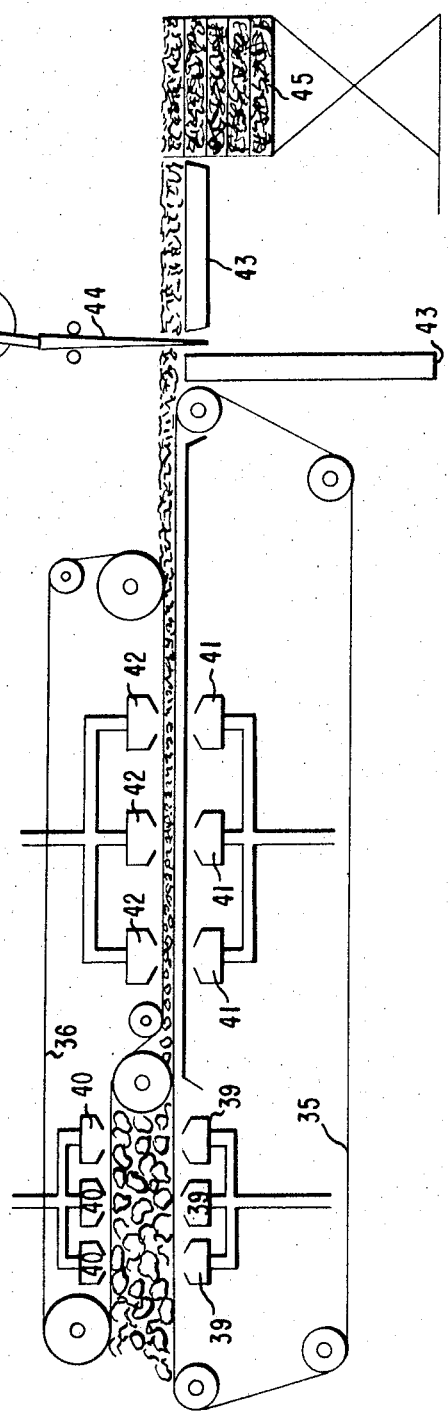
FIG. 6 is an enlarged schematic diagram of the bonding station shown in FIG. 1 including the composite microfoam board cutting and stacking stations.

The section of apparatus from the horizontal conveyor belt through to the cooling-compressing treatment is called the bonding station as previously indicated. This nonconventional apparatus and a more detailed drawing are shown in FIG. 6.

The composite board is fed onto a cutting table 43 where a guillotine knife 44 severs the sheets into the lengths desired. The cut boards are then fed onto stacking table 45 and the boards are ready for use.

Typical composite boards prepared according to the preferred embodiment are prepared from microfoam sheeting having a thickness of about one thirty-second to one-fourth inch, preferably one-sixteenth to three-sixteenth inch, reduced to an average flake size having a surface area of about 0.05 to 4 square inches. The composite board has a thickness of about ¼ to 3 inches, preferably ½ to 2¼ inches; a density of about 0.8 to 5 lbs./ft.$^3$, preferably about 1.1 to 3.5 lbs./ft.$^3$; a tensile strength at break of about 0.3 to 10 psi, preferably 0.7 to 8 psi, and a compression set of about 5 to 50 percent, preferably 8 to 30 percent. The compression set is the loss in thickness compared to the original thickness of a composite board compressed with 0.5 psi for 200 to 500 hours and then released for four hours in accordance with Military Specification MIL–C–26861A, Sept. 5, 1962, section 4.6.8 Compression Set. Therein, compression set is expressed as Compression Set (%) = $[(t_o-t_s)/t_o]100$ wherein:
$t_o$ = original thickness
$t_s$ = final thickness after 4 hours in unloaded condition.

The preferred values are preferred because they result in a well bonded composite board having excellent cushioning properties that can be made in an economical and convenient manner.

The following examples illustrate this invention. All parts, percentages and proportions are by weight unless otherwise indicated.

EXAMPLE 1

Two continuous belts of cheesecloth are made to converge and pass through two nip rolls. Microfoam sheeting prepared from isotactic polypropylene, in accordance with U.S. Pat. application, Ser. No. 797,312, filed Dec. 27, 1968, Example 1, is reduced to flakes having a maximum dimension of about 1 inch and is sprinkled on top of the lower cheesecloth belt. As the belts carry the flakes toward the nip rolls, the flakes are heated for about 3 to 4 seconds by a hot air blast at a temperature of about 180°–200°C. prior to the entrance of the flakes into the nip of the rolls. The belt is moving at a speed of about 10 feet per minute. The flakes are cooled in the nip rolls at room temperature and a continuous, self-supporting composite board having a thickness of about one-fourth inch exits the nip rolls. Inspection of the board reveals that the flakes are well bonded together, that the composite board is of sturdy construction and is useful as a flexible cushioning sheet.

EXAMPLE 2

Strips of microfoam sheeting prepared from isotactic polypropylene in accordance with U.S. Pat. application Ser. No. 797,312 filed Dec. 27, 1968, Example 1, are fed through a conventional cutter and reduced to flakes of approximately ½ inch to 2 inches square. The flakes are then blown pneumatically into a storage bin. From the storage bin, the flakes are pneumatically conveyed by suction to an adhesive spray station where the flakes are airborne and sprayed with Elvax D 1113 (trademark of E. I. du Pont de Nemours and Company), a water dispersion containing about 50 percent solids of a copolymer of 75/25 weight percent ethylene/vinyl acetate copolymer having a very high molecular weight. The flakes are sprayed at a rate sufficient to deposit about 0.5 pound of adhesive spray per pound of flakes. The sprayed flakes are then conveyed by suction to a batt-forming station wherein the flakes are directed onto a chute and laid down as a batt layer approximately 4 inches thick and 4 feet wide. The batt layer is directed through a bonding station where the batt in loose flake form is heated to a temperature of about 140°–150°C. then compressed to a thickness of about 1 inch followed by cooling. At a temperature of about 60°C., the adhesive hardens thereby forming a composite board. The composite board is formed at a rate of approximately 2 feet per minute having a thickness of 1¼ inches.

The composite board has the following properties: density varies between about 1.4 and 1.5 lbs./cu.ft.; tensile strength at break is about 4.3 psi; elongation at break is about 22 percent; and compression set is about 12 percent. The load to compress the board (a) 20 percent of its thickness is 3.6 psi and (b) 50 percent of its thickness is 11.5 psi. The dynamic cushioning of this board, if tested according to Military Specification MIL-C-26861A, section 1.2, is grade C for loads of classes 3 and 4. The hot growth of this board, i.e., increase in thickness at time and temperature, is 16 percent in 4 hours at 80°C.

EXAMPLE 3

A composite board is prepared in the same manner as that described in Example 2 except that the adhesive is a curable mixture of 100 parts by weight of Elvax D 1070 (trademark of E. I. du Pont de Nemours and Company), an ionomeric water dispersion containing 42 percent solids of an ion linked acid modified ethylene interpolymer; 4 parts by weight of Cymel 301 (trademark of American Cyanamid Company), a synthetic resin based on melamine-formaldehyde filled with alpha cellulose, chopped fabric, glass fiber and asbestos fiber; and 8 parts by weight of ammonium bromide. After the composite board is formed, it is subjected to a temperature of about 130°C. for 2 minutes to cure the adhesive. The composite board formed has substantially the same properties as the composite board of Example 2 except that it is less deformable by heat, i.e., hot growth is only 5 percent in 4 hours at 80°C.

I claim:

1. The composite board comprising flakes of foam bonded together in which the foam is a polyhydrocarbon having polyhedral cells with a minimum diameter of at least about 500 microns and a work-to-break value of at least about 10,000 inch-pounds per cubic inch.

2. The composite board of claim 1 in which the polyhydrocarbon is linear polyethylene.

3. The composite board of claim 1 in which the polyhydrocarbon is isotactic polypropylene.

4. The composite board of claim 1 in which the board is about ¼ to 3 inches thick with a density of about 0.8 to 5 pounds per cubic foot, a breaking tensile strength of about 0.3 to 10 psi and a compression set of about 5 to 50 percent.

5. The composite board of claim 1 in which the flakes are bonded with an adhesive.

6. The composite board of claim 5 in which the adhesive is an ionomeric resin dispersion.

7. The composite board of claim 5 in which the adhesive is a vinyl resin dispersion.

8. The composite board of claim 1 wherein the foam is isotactic polypropylene having polyhedral cells with a minimum diameter of at least about 500 microns and a work-to-break value of at least about 10,000 inch-pounds per cubic inch, the foam flakes are bonded together with an adhesive which is an ionomeric resin dispersion and the composite board has a thickness of about ½ to 2¼ inches, a density of about 1.1 to 3.5 lbs/ft.$^3$, a tensile strength of about 0.7 to 8 psi and a compression set of about 8 to 30 percent.

9. The composite board of claim 8 in which the adhesive is a vinyl resin dispersion.

* * * * *